US012244494B2

(12) United States Patent
Sankar et al.

(10) Patent No.: US 12,244,494 B2
(45) Date of Patent: *Mar. 4, 2025

(54) SERVER FABRIC ADAPTER FOR I/O SCALING OF HETEROGENEOUS AND ACCELERATED COMPUTE SYSTEMS

(71) Applicant: Enfabrica Corporation, Mountain View, CA (US)

(72) Inventors: Rochan Sankar, Mountain View, CA (US); Shrijeet Mukherjee, Mountain View, CA (US); Ariel Hendel, Mountain View, CA (US); Carlo Contavalli, Mountain View, CA (US); Shimon Muller, Mountain View, CA (US)

(73) Assignee: Enfabrica Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/778,611

(22) Filed: Jul. 19, 2024

(65) Prior Publication Data
US 2024/0372805 A1    Nov. 7, 2024

Related U.S. Application Data

(63) Continuation of application No. 17/570,261, filed on Jan. 6, 2022, now Pat. No. 12,120,021.
(Continued)

(51) Int. Cl.
*H04L 49/9057* (2022.01)
*H04L 45/00* (2022.01)
(Continued)

(52) U.S. Cl.
CPC ............ *H04L 45/566* (2013.01); *H04L 45/38* (2013.01); *H04L 47/2483* (2013.01);
(Continued)

(58) Field of Classification Search
CPC ... H04L 45/566; H04L 45/38; H04L 47/2483; H04L 47/30; H04L 49/9057; H04L 69/22
See application file for complete search history.

(56) References Cited

U.S. PATENT DOCUMENTS 6,594,712 B1  7/2003  Pettey et al.
7,181,541 B1  2/2007  Burton et al.
(Continued)

FOREIGN PATENT DOCUMENTS

WO   WO-2005106693 A2   11/2005
WO   WO-2022108498 A1    5/2022

OTHER PUBLICATIONS

U.S. Appl. No. 17/570,261, filed Jan. 6, 2022, Server Fabric Adapter For I/O Scaling Of Heterogeneous And Accelerated Compute Systems, Rochan Sankar, et al.
(Continued)

*Primary Examiner* — Lesa M Kennedy
(74) *Attorney, Agent, or Firm* — Goodwin Procter LLP

(57) ABSTRACT

A server fabric adapter (SFA) communication system is disclosed. In some embodiments, the SFA communication system comprises an SFA communicatively coupled to a plurality of controlling hosts, a plurality of endpoints, and a plurality of network ports. The SFA is configured to receive a network packet from a network port of the plurality of network ports; separate the network packet into different portions, each portion including a header or a payload; map each portion of the network packet to: (i) a controlling host of the plurality controlling hosts, the controlling host being designated as a destination controlling host, or (ii) an endpoint of the plurality of endpoints, the endpoint being designated as a destination endpoint; and forward a respective portion of the network packet to the destination controlling host or the destination endpoint.

20 Claims, 13 Drawing Sheets

Related U.S. Application Data

(60) Provisional application No. 63/134,586, filed on Jan. 6, 2021.

(51) Int. Cl.
   *H04L 47/2483*   (2022.01)
   *H04L 47/30*   (2022.01)
   *H04L 69/22*   (2022.01)

(52) U.S. Cl.
   CPC .......... *H04L 47/30* (2013.01); *H04L 49/9057* (2013.01); *H04L 69/22* (2013.01)

(56) References Cited

U.S. PATENT DOCUMENTS

| | | | |
|---|---|---|---|
| 7,937,447 | B1 | 5/2011 | Cohen et al. |
| 8,301,717 | B2 | 10/2012 | Deshpande |
| 8,719,456 | B2 | 5/2014 | Wilkinson |
| 9,448,901 | B1 | 9/2016 | Aslam et al. |
| 9,684,597 | B1 | 6/2017 | Eiriksson |
| 9,864,519 | B2 | 1/2018 | Meyer et al. |
| 9,934,152 | B1 | 4/2018 | Bryant et al. |
| 10,152,428 | B1 | 12/2018 | Alshawabkeh et al. |
| 10,447,767 | B2 | 10/2019 | Baptist et al. |
| 10,503,658 | B2 | 12/2019 | Basu et al. |
| 10,778,521 | B2 | 9/2020 | Liguori et al. |
| 2001/0046212 | A1 | 11/2001 | Nakajima |
| 2002/0078271 | A1 | 6/2002 | Berry |
| 2002/0129272 | A1 | 9/2002 | Terrell et al. |
| 2002/0159385 | A1 | 10/2002 | Susnow et al. |
| 2002/0184452 | A1 | 12/2002 | Simmons et al. |
| 2002/0191599 | A1 | 12/2002 | Parthasarathy et al. |
| 2003/0058875 | A1 | 3/2003 | Arndt et al. |
| 2003/0154412 | A1 | 8/2003 | Hetzler et al. |
| 2004/0049603 | A1 | 3/2004 | Boyd et al. |
| 2005/0068798 | A1 | 3/2005 | Lee et al. |
| 2005/0080920 | A1 | 4/2005 | Bender et al. |
| 2005/0089033 | A1 | 4/2005 | Gupta et al. |
| 2005/0223118 | A1 | 10/2005 | Tucker et al. |
| 2006/0004941 | A1 | 1/2006 | Shah et al. |
| 2006/0056405 | A1 | 3/2006 | Chang et al. |
| 2006/0236063 | A1 | 10/2006 | Hausauer et al. |
| 2006/0271713 | A1 | 11/2006 | Xie et al. |
| 2007/0038794 | A1 | 2/2007 | Purcell et al. |
| 2007/0104102 | A1 | 5/2007 | Opsasnick |
| 2007/0255802 | A1 | 11/2007 | Aloni et al. |
| 2007/0283123 | A1 | 12/2007 | Vick et al. |
| 2008/0043732 | A1 | 2/2008 | Desai et al. |
| 2008/0168194 | A1 | 7/2008 | Gregg et al. |
| 2009/0083392 | A1 | 3/2009 | Wong et al. |
| 2009/0113143 | A1 | 4/2009 | Domsch et al. |
| 2010/0064070 | A1 | 3/2010 | Yoshimura et al. |
| 2010/0232448 | A1 | 9/2010 | Sugumar et al. |
| 2011/0072234 | A1 | 3/2011 | Chinya et al. |
| 2011/0268119 | A1* | 11/2011 | Pong ...................... H04L 69/22 370/392 |
| 2011/0271010 | A1 | 11/2011 | Kenchammana et al. |
| 2013/0024591 | A1 | 1/2013 | Sun |
| 2013/0031328 | A1 | 1/2013 | Kelleher et al. |
| 2013/0318322 | A1 | 11/2013 | Shetty et al. |
| 2015/0082000 | A1 | 3/2015 | Hong et al. |
| 2015/0089009 | A1 | 3/2015 | Tsirkin et al. |
| 2016/0070475 | A1 | 3/2016 | Zhang et al. |
| 2016/0085450 | A1 | 3/2016 | Ahn et al. |
| 2016/0162422 | A1 | 6/2016 | Weber |
| 2017/0097909 | A1 | 4/2017 | Simionescu et al. |
| 2017/0132148 | A1 | 5/2017 | Liu et al. |
| 2017/0177520 | A1 | 6/2017 | Kampe et al. |
| 2017/0185528 | A1 | 6/2017 | Hansson et al. |
| 2017/0372088 | A1 | 12/2017 | Zhao et al. |
| 2018/0024938 | A1 | 1/2018 | Paltashev et al. |
| 2018/0198715 | A1 | 7/2018 | Shmilovici et al. |
| 2019/0141041 | A1 | 5/2019 | Bhabbur et al. |
| 2019/0173810 | A1 | 6/2019 | Shpiner et al. |
| 2019/0220425 | A1 | 7/2019 | Zemach et al. |
| 2019/0258415 | A1 | 8/2019 | Imamura |
| 2019/0294366 | A1* | 9/2019 | Kawamura ............. G06F 3/061 |
| 2019/0320019 | A1 | 10/2019 | Hamrick, Jr. |
| 2019/0324917 | A1 | 10/2019 | Cui et al. |
| 2019/0370173 | A1 | 12/2019 | Boyer et al. |
| 2019/0379767 | A1 | 12/2019 | Sharma et al. |
| 2020/0004685 | A1 | 1/2020 | Guim Bernat et al. |
| 2020/0119753 | A1 | 4/2020 | Chirca et al. |
| 2020/0159669 | A1 | 5/2020 | Duncan et al. |
| 2020/0177513 | A1 | 6/2020 | Zhang |
| 2020/0236052 | A1 | 7/2020 | Srinivasan et al. |
| 2020/0280518 | A1 | 9/2020 | Lee et al. |
| 2020/0371955 | A1 | 11/2020 | Goodacre et al. |
| 2020/0387405 | A1 | 12/2020 | Xiao et al. |
| 2021/0019069 | A1 | 1/2021 | Sen et al. |
| 2021/0037107 | A1 | 2/2021 | Klenk et al. |
| 2021/0075633 | A1 | 3/2021 | Sen et al. |
| 2021/0083981 | A1 | 3/2021 | Shmilovici et al. |
| 2021/0232312 | A1 | 7/2021 | Prasad et al. |
| 2021/0234706 | A1 | 7/2021 | Nair et al. |
| 2021/0345112 | A1 | 11/2021 | Elliott et al. |
| 2022/0060422 | A1 | 2/2022 | Sommers |
| 2022/0085916 | A1 | 3/2022 | Debbage et al. |
| 2022/0109587 | A1 | 4/2022 | Sapio et al. |
| 2022/0200906 | A1 | 6/2022 | Ye et al. |
| 2022/0214912 | A1 | 7/2022 | Julien et al. |
| 2022/0217085 | A1 | 7/2022 | Sankar et al. |
| 2022/0222118 | A1 | 7/2022 | Wang et al. |
| 2022/0283964 | A1 | 9/2022 | Burstein et al. |
| 2022/0291875 | A1 | 9/2022 | Diaz-Cuellar et al. |
| 2024/0098023 | A1 | 3/2024 | Guo |

OTHER PUBLICATIONS

U.S. Appl. No. 18/747,118, filed Jun. 18, 2024, Optimally Balanced Network Systems, Rochan Sankar, et al.

U.S. Appl. No. 17/836,532, filed Jun. 9, 2022, Transparent Remote Memory Access Over Network Protocol, Thomas Norrie, et al.

U.S. Appl. No. 18/755,372, filed Jun. 26, 224, Transparent Remote Memory Access Over Network Protocol, Thomas Norrie, et al.

U.S. Appl. No. 17/886,026, filed Aug. 11, 2022, System And Method For Congestion Control Using A Flow Level Transmit Mechanism, Shrijeet Mukherjee et al.

U.S. Appl. No. 18/102,033, filed Jan. 26, 2023, System And Method For One-Sided Read Rma Using Linked Queues, Shrijeet Mukherjee, et al.

U.S. Appl. No. 18/107,324, filed Feb. 8, 2023, System And Method For Using Dynamic Thresholds With Route Isolation For Heterogeneous Traffic In Shared Memory Packet Buffers, Ari Aravinthan, et al.

U.S. Appl. No. 18/447,180, filed Aug. 9, 2023, System And Method For Ghost Bridging, Thomas Norrie, et al.

U.S. Appl. No. 18/666,548, filed May 16, 2024, System And Method For An Optimized Staging Buffer For Broadcast/Multicast Operations, Shrijeet Mukherjee, et al.

U.S. Appl. No. 18/526,727, filed Dec. 1, 2023, A Modular Datacenter Interconnection System, David Skirmont, et al.

U.S. Appl. No. 18/785,542, filed Jul. 26, 2024, Method And System For Tracking And Moving Pages Within A Memory Hierarchy, Shrijeet Mukhrjee, et al.

Emulex Corporation. "Emulex provides 10Gb Ethernet Virtual Fabric Adapter 5 for New Lenovo Servers." Business Wire. Dec. 15, 2014 (Dec. 15, 2014) Retrieved on Mar. 7, 2022 (Mar. 7, 2022 from: <https://www.businesswire.com/news/home/20141215005718/en/Emulex-provides-10Gb-Ethernet-Virtual-Fabric-Adapter-5-New-Lenovo-Ervers>entire dcument.

International Search Report and Written Opinion for International Patent Application No. PCT/US2022/011491, dated Mar. 24, 2022 (8 pages).

International Search Report and Written Opinion for International Patent Application No. PCT/US2022/32841, dated Nov. 21, 2022 (10 pages).

International Search Report and Written Opinion for International Patent Application No. PCT/US2022/74833, dated Dec. 6, 2022 (8 pages).

(56) References Cited

OTHER PUBLICATIONS

International Search Report and Written Opinion for International Patent Application No. PCT/US2023/062168, dated May 12, 2023 (54 pages).
International Search Report and Written Opinion for International Patent Application No. PCT/US2023/61405, dated Jul. 11, 2023 (6 pages).
International Search Report and Written Opinion for International Patent Application No. PCT/US2023/082132, dated Jun. 6, 2024 (8 pages).
International Search Report and Written Opinion for International Patent Application No. PCT/US2024/029723, dated Aug. 22, 2024 (13 pages).

\* cited by examiner

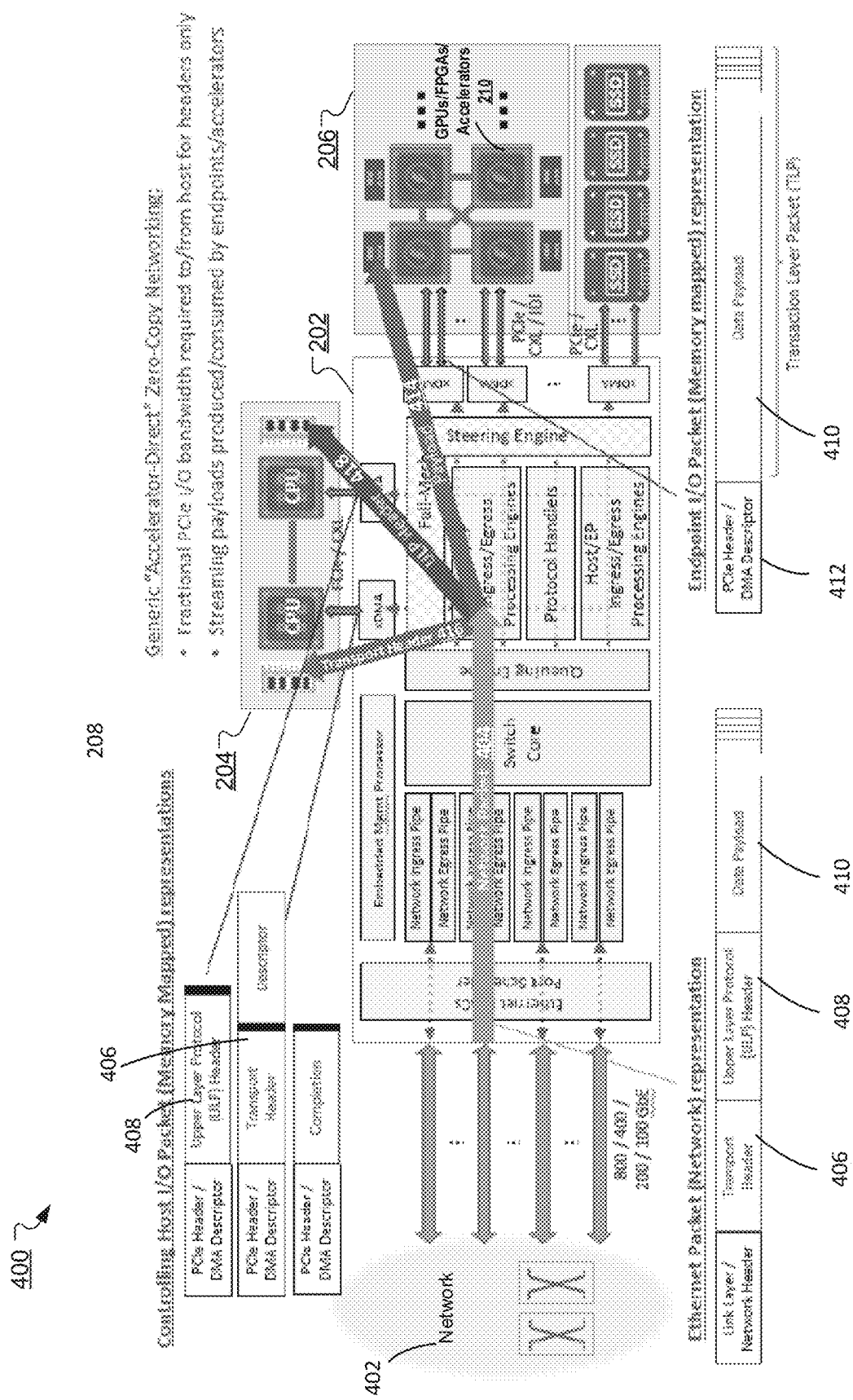
Figure 4 (Network to Host/Endpoint)

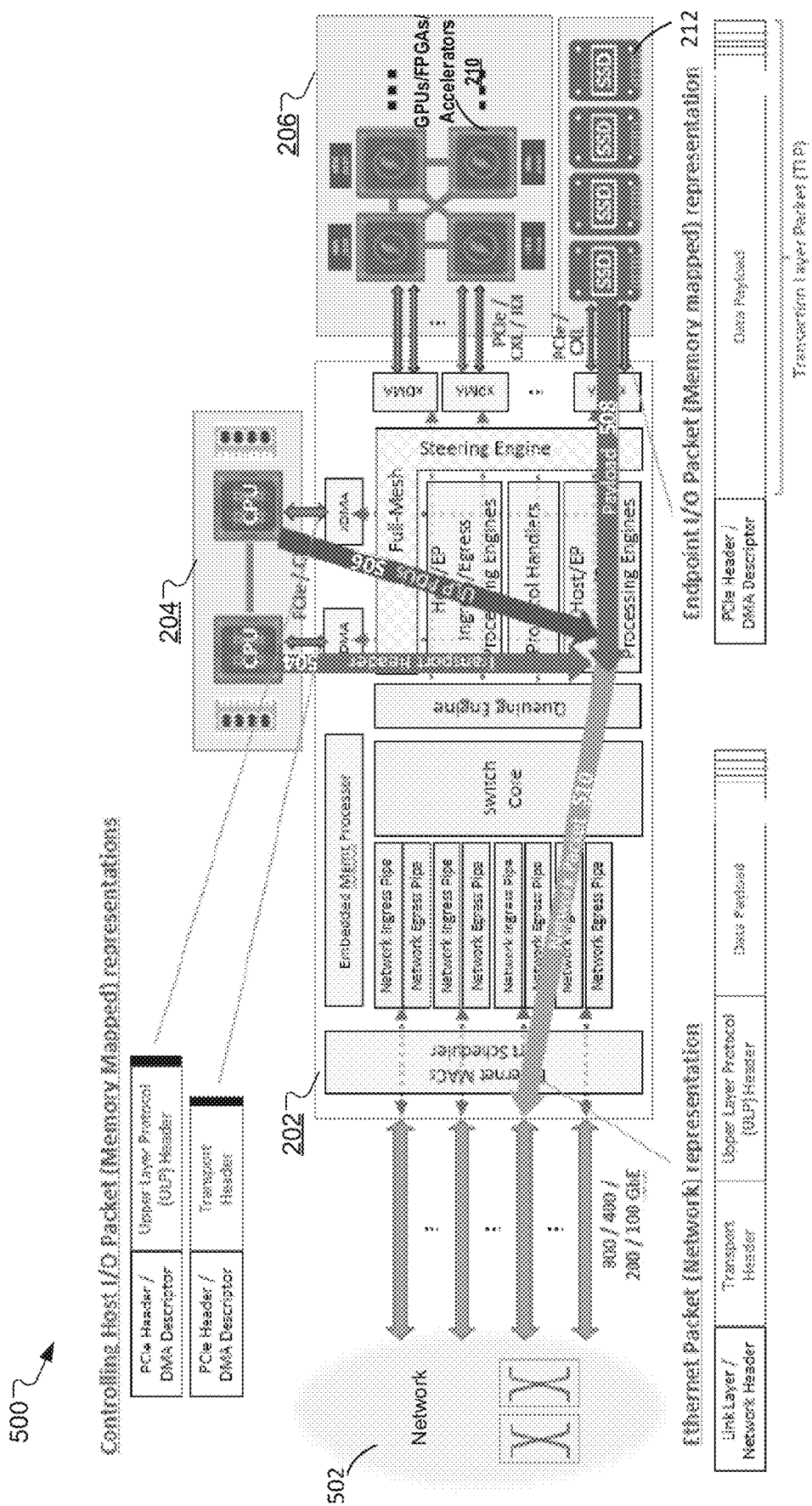
Figure 5 (Host/Endpoint to Network)

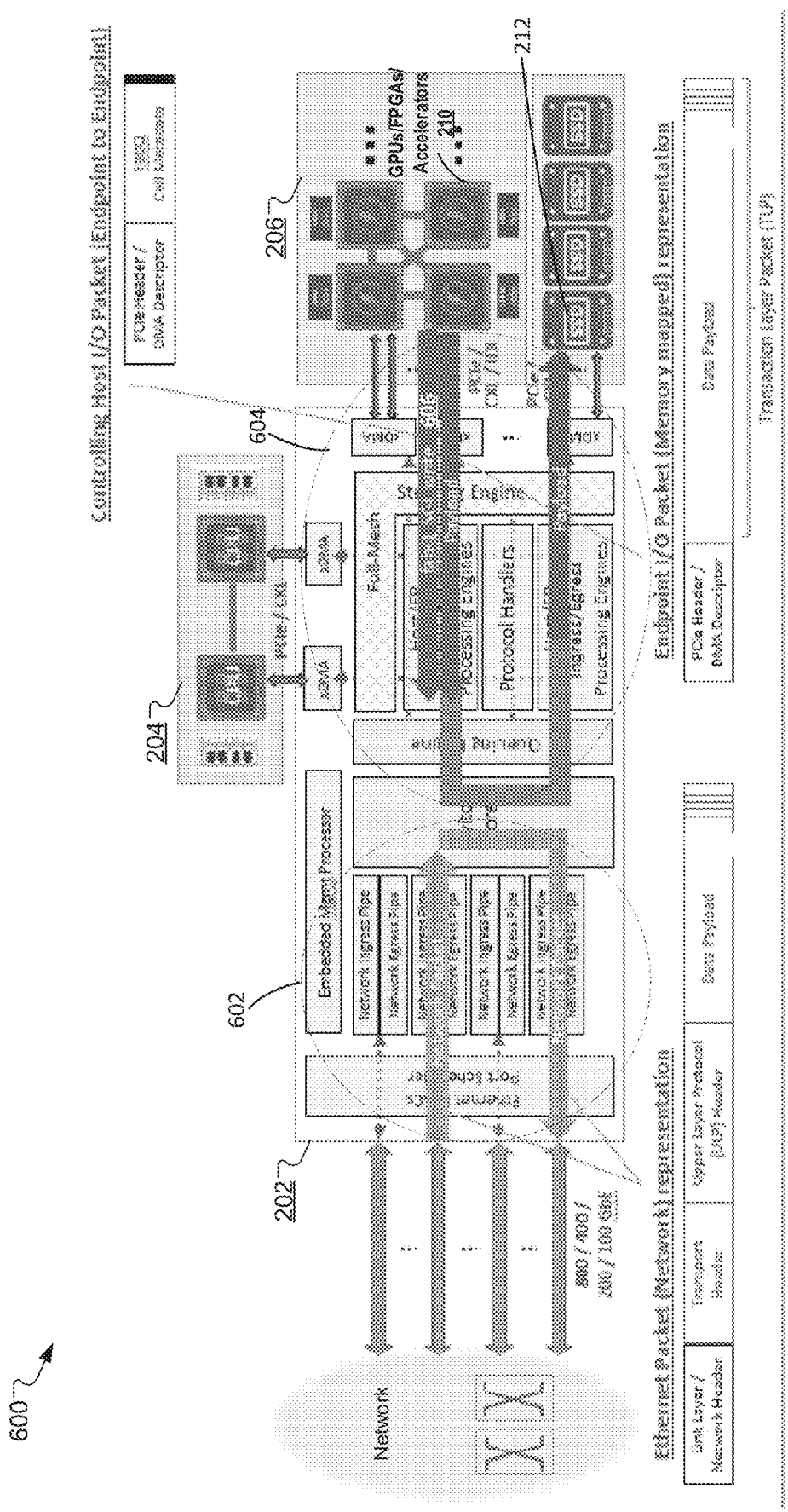
Figure 6 (Peer to Peer)

SERVER FABRIC ADAPTER FOR I/O SCALING OF HETEROGENEOUS AND ACCELERATED COMPUTE SYSTEMS

CROSS REFERENCE TO RELATED APPLICATION

This application is a continuation of U.S. patent application Ser. No. 17/570,261, filed Jan. 6, 2022, which claims the benefit of and priority to U.S. Provisional Patent Application No. 63/134,586, filed Jan. 6, 2021, the entire contents of each of which are incorporated by reference in their entireties.

TECHNICAL FIELD

This disclosure relates to a communication system that can improve communication speeds within a processing system having several processors and/or the speed of communication between such a system and a network.

BACKGROUND

Servers are processing larger and larger quantities of data for various applications in the cloud, such as business intelligence and analytics, information technology automation and productivity, content distribution, social networking, gaming and entertainment, etc. In recent years, the slowing down of Moore's Law and Dennard Scaling in industry-standard semiconductor processors, coupled with an increase in specialized workloads that require high data processing performance such as machine learning and database acceleration has given rise to server acceleration. As a result, a standard central processing unit (CPU), often in a multiprocessor architecture, is augmented by other peripheral component interconnect express (PCIe)-attached domain-specific processors such as graphics processing units (GPUs) or field-programmable gate arrays (FPGAs) to form a heterogeneous compute server. However, the existing designs of the heterogeneous compute server using network interface controllers (NICs), private network fabric, etc., have a lot of shortcomings. These shortcomings include, but are not limited to, bandwidth bottleneck, complex packet processing, scaling limitations, insufficient load balancing, lack of visibility and control, etc.

SUMMARY

To address the aforementioned shortcomings, a server fabric adapter (SFA) communication system is provided. In some embodiments, the SFA communication system comprises an SFA communicatively coupled to a plurality of controlling hosts, a plurality of endpoints, and a plurality of network ports. The SFA receives a network packet from a network port of the plurality of network ports. The SFA separates the network packet into different portions, each portion including a header or a payload. The SFA then maps each portion of the network packet to: (i) a controlling host of the plurality controlling hosts, the controlling host being designated as a destination controlling host, or (ii) an endpoint of the plurality of endpoints, the endpoint being designated as a destination endpoint. The SFA further forwards a respective portion of the network packet to the destination controlling host or the destination endpoint.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 4 illustrates an exemplary data flow diagram from a network to a host or endpoint, according to some embodiments.

FIG. 5 illustrates an exemplary data flow diagram from a host/endpoint to a network, according to some embodiments.

FIG. 6 illustrates an exemplary peer-to-peer data packet flow diagram, according to some embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative
} embodiments of the structures and methods illustrated herein may be employed without departing from the principles described herein.

Figure 1A:
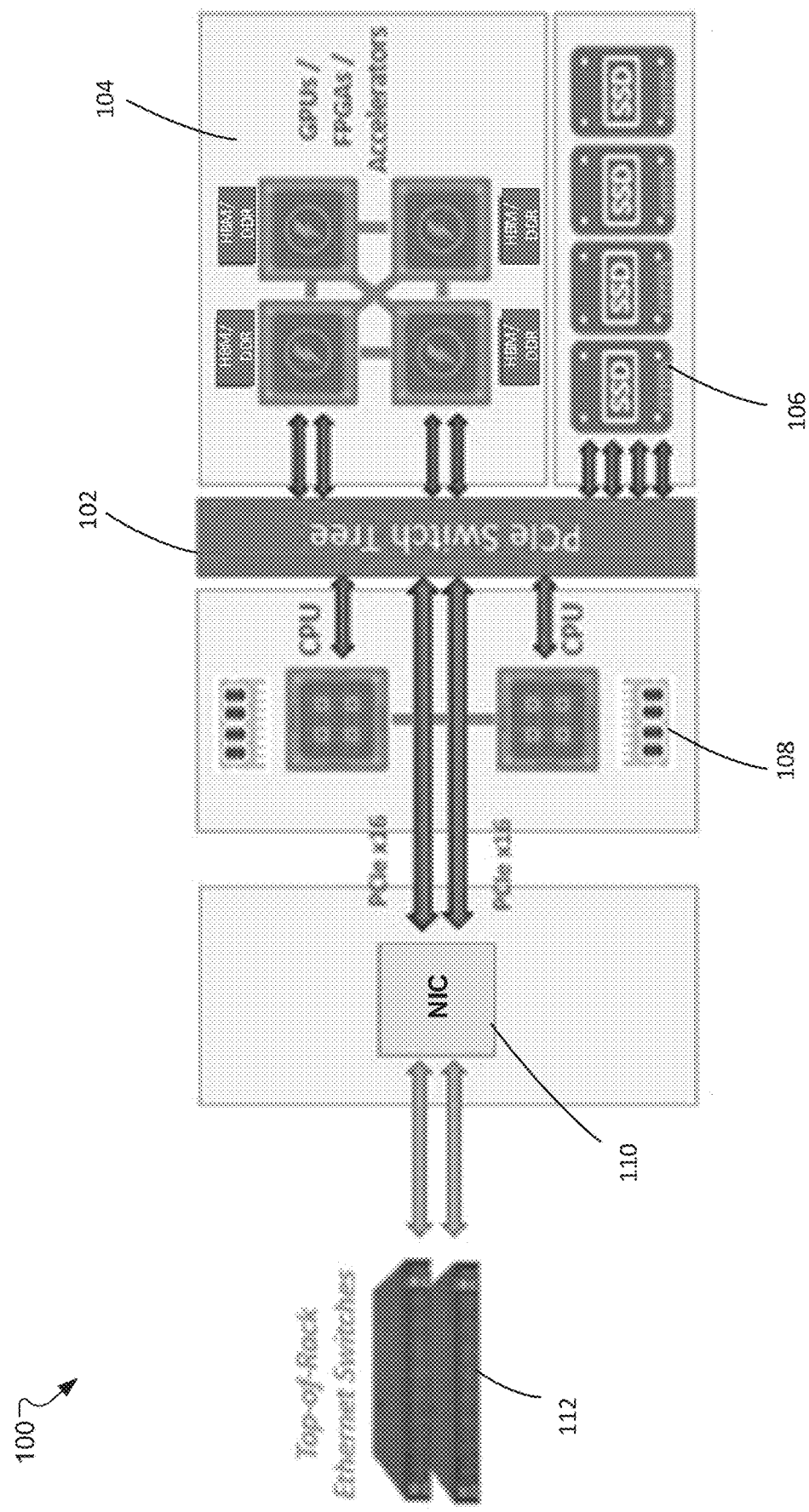
FIG. 1A illustrates an example prior art accelerated server architecture using a network interface controller (NIC).

FIG. 1A illustrates an example prior art accelerated server architecture 100 using a network interface controller (NIC). The server architecture 100 is usually used in a data center for applications such as distributed neural network training, ray-tracing graphics processing, or scientific computing, etc. A PCIe switch tree is a collection of PCIe switches that connect to each other. As depicted, a PCIe switch tree 102 connects graphics processing units (GPUs), field programmable gate arrays (FPGAs), or other accelerators 104. PCIe switch tree 102 may also connect storage elements (e.g., flash-based solid state drives (SSDs)) or storage-class memories to central processing units (CPUs) 108 and GPUs 104. In order to communicate with other server systems in the data center, architecture 100 also includes a network interface controller (NIC). A NIC may forward packets between processors/storage (e.g., 108/106) and top-of-rack Ethernet switches 112. A recent variant of such NIC devices is a NIC 110. NIC 110 typically includes an advanced processor complex based on a multi-core instruction set, and the processor complex is similar to the type of processing engine used in the CPUs of a server.

Prior accelerated computing systems, such as system 100 shown in FIG. 1A, suffer from numerous problems. These problems include, but are not limited to, low radix or scalability, PCIe bandwidth constraints, the complexity in implementing coherent compute express link (CXL) .mem and .cache operations, poor resiliency, weakened security, etc. For example, a single GPU may saturate an 800G input/output (I/O) link, which may exceed the I/O bandwidth of a PCIe/CXL interface between a CPU and the GPU, as well as the I/O bandwidth of the NIC or NIC 110.

The use of NIC 110 may cause additional problems for system 100. Since all paths in and out of the accelerated complex are through a single path network interface (e.g., NIC 110), this tends to create a bandwidth bottleneck (e.g., 200 Gigabits) to and from the network fabric. The complex packet processing offload also places an operational burden on the infrastructure operator and deployment engineers. Further, given a small target form factor (typically a mezzanine card attached to the CPU motherboard), the cost and power scaling to provide the required bandwidth with features would be intolerable. There is also an operating system (OS) instance explosion problem outside the host CPU. That is, while the NIC effectively doubles the number of OS instances in the entire data center, half of these OS instances are running on a different, customized instruction-set architecture (ISA) as compared to the industry-standard ISA of the CPU (e.g., x86 or ARM). Moreover, software stack investment and portability are challenging. Using NIC 110 in FIG. 1A, the entire communication stack for every single application networking operation or remote procedure call in the cloud must be ported, qualified, and secured on the processing architecture of the new NIC 110. This creates a high non-recoverable investment for both the NIC vendors as well as the data center operator.

Figure 1B:
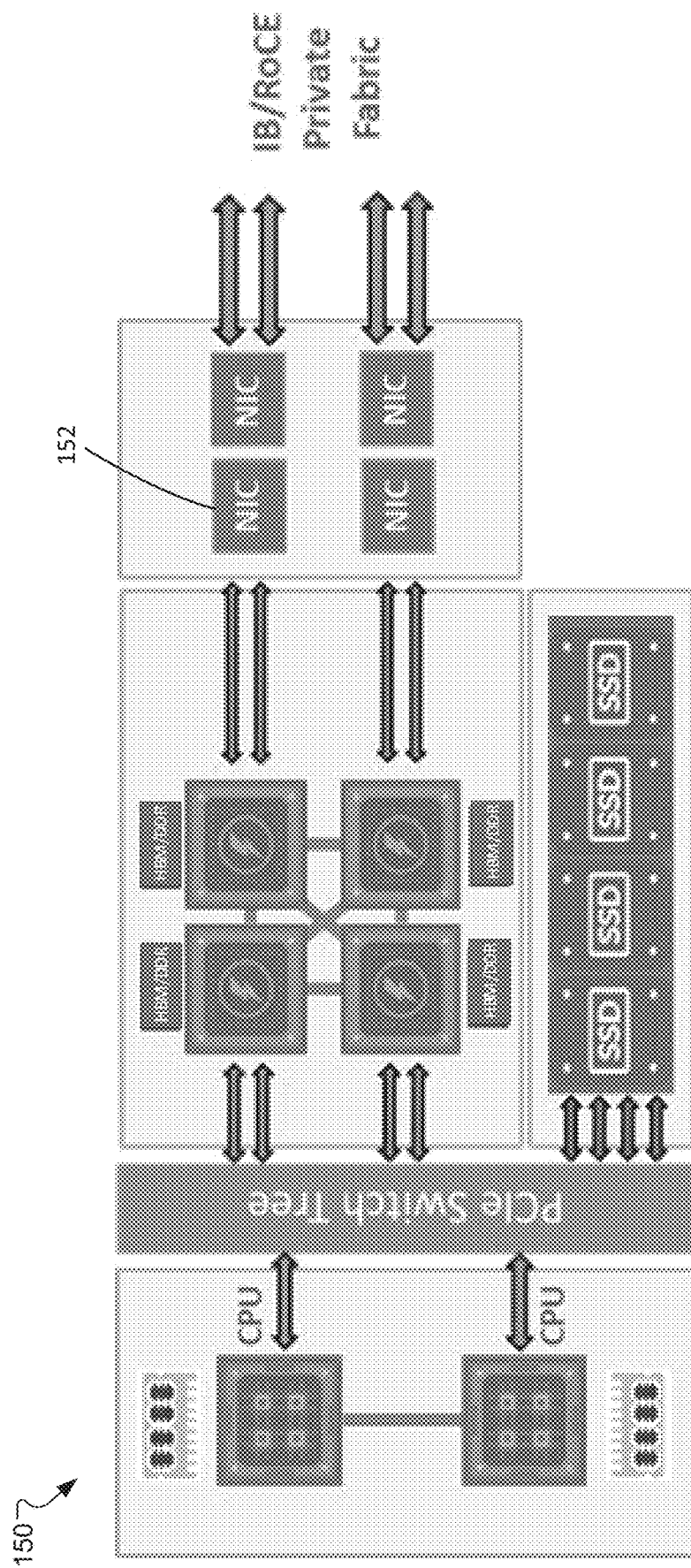
FIG. 1B illustrates an alternative example prior art accelerated server architecture using a private network fabric.

FIG. 1B illustrates an alternative example prior art accelerated compute system 150, which employs a private network fabric between accelerators (e.g., GPUs), separate from the main data center network. As depicted, the private network fabric typically uses a dedicated NIC 152 per GPU (or per two GPUs) connected via isolated PCIe interfaces. NIC 152 uses a dedicated communication scheme implemented in hardware such as GPU-direct over Infiniband (IB) or remote direct memory access (RDMA) over Converged Ethernet (RoCE), to enable the GPU to transmit data to and from the NIC's network port(s) without copying the data to the server's CPU. This mechanism can be generally described as zero-copy I/O.

This private fabric NIC 152, however, still has a number of drawbacks that significantly impact the performance of system 150. Since NIC 152 and its adjoint accelerator need to be on the same level of a PCIe tree, significant stranding of computational resources in the accelerator and the bandwidth provisioned occurs. With this hard assignment (i.e., absence of elasticity in the design), each path has to be maximally provisioned. Also, using private fabric NIC 152, load balancing is only feasible within the accelerator domain attached to the NIC but not across multiple accelerators. In addition, the transport protocol is codified in the NIC hardware instead of being disaggregated, which creates scaling limitations as to how many accelerators can be networked in a stable manner. Again, the transport capacity of each NIC must be the maximum, as no other NIC can provide capacity if the load exceeds the capacity of the NIC. Furthermore, since the embedded transport resides in part inside the private fabric NIC, this creates a lack of visibility and control for operations of the data center network.

Additional infrastructure problems exist with the deployment using PCIe switch trees and NICs. First, provisioning and management systems have to constantly reconcile the PCIe domain and the network domain. For example, security posture is expressed in memory terms for PCIe but in network addresses for the network. Also, isolation in the network is very different from isolation and reachability in the PCIe fabrics. The reconciliation may also reflect in job placement and performance management. In addition to the continuous reconciliation problem, there is also the problem of poor resource utilization. Because each link in the PCIe trees that connects to a NIC has to be maximally configured, the link consumes half of the total bandwidth of the PCIe switch even before any real data starts to transmit. Moreover, using this infrastructure in FIG. 1B, transport is locked to hardware ISA, operations are costly and non-agile, etc.

Generally, the NIC, and PCI switches in prior systems (e.g., as shown in FIGS. 1A and 1B) map their I/O communication packets into memory-mapped PCIe address space of a single device. This can be inefficient and/or ineffective, if that single device is not designated to process the entire packet routed thereto. This is often the case when specialized processors are used in conjunction with a general purpose processor, where a portion of the packet, typically a header, is analyzed by the general purpose processor, and another portion of the same packet is analyzed/processed by a specialized processor. In this case, routing the entire packet to a general purpose processor or to a specialized processor can create bottlenecks at these devices since the remainder of the packet may need to be forwarded internally, adding to the communication burden. A new infrastructure, as shown below in FIGS. 2-7 will be described in this disclosure to improve the performance of the prior accelerated compute systems.

Server Fabric Adapter (SFA) System Overview

Figure 2:
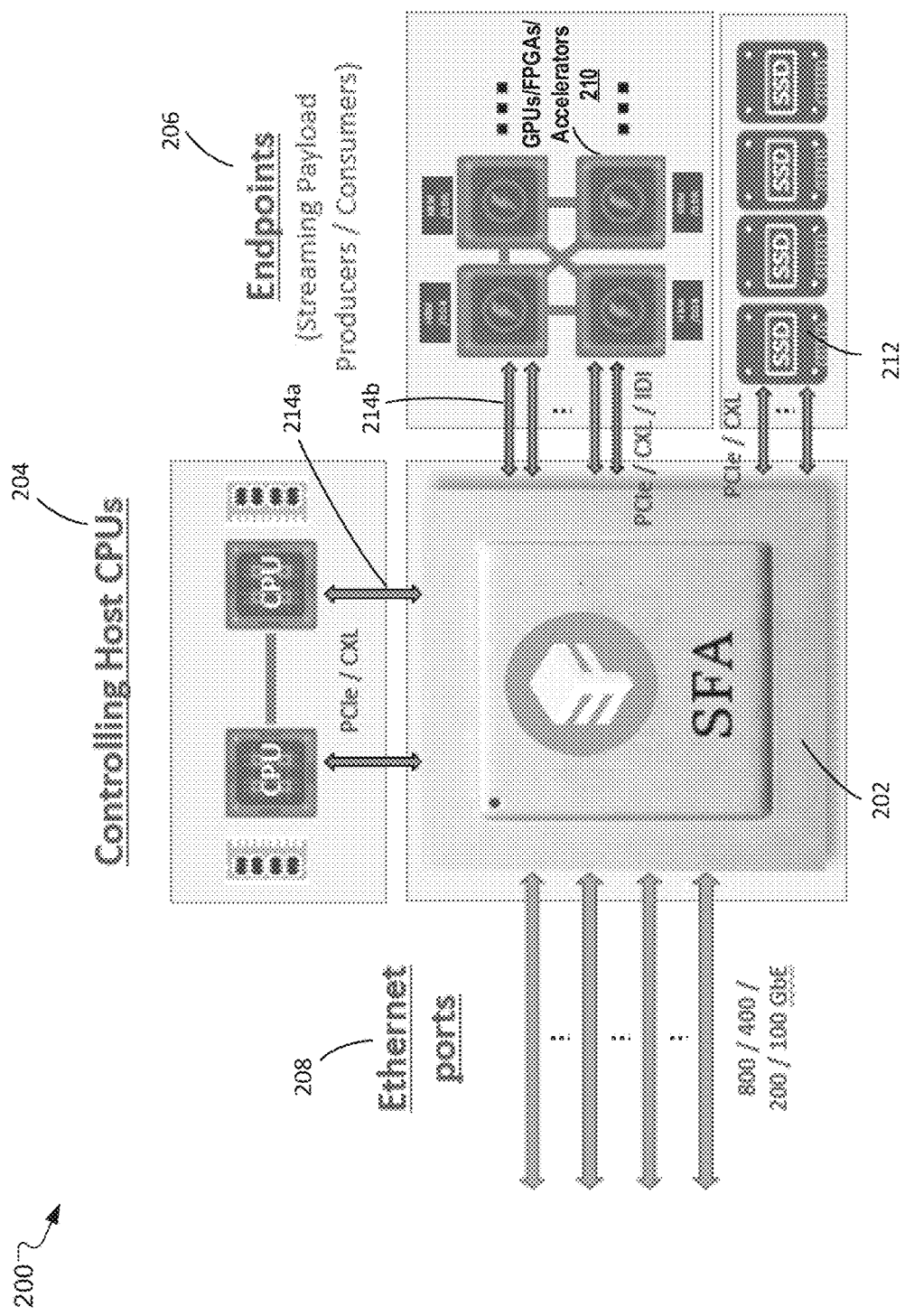
FIG. 2 illustrates an exemplary server fabric adapter architecture for accelerated and/or heterogeneous computing systems, according to some embodiments.

FIG. 2 illustrates an exemplary server fabric adapter architecture 200 for accelerated and/or heterogeneous computing systems in a data center network. In some embodiments, a server fabric adapter (SFA) 202 may connect to one or more controlling host CPUs 204, one or more endpoints 206, and one or more Ethernet ports 208. An endpoint 206 may be a GPU, accelerator, FPGA, etc. Endpoint 206 may also be a storage or memory element 212 (e.g., SSD), etc.

SFA 202 may communicate with the other portions of the data center network via the one or more Ethernet ports 208.

In some embodiments, the interfaces between SFA 202 and controlling host CPUs 204 and endpoints 206 are shown as over PCIe/CXL 214a or similar memory-mapped I/O interfaces. In addition to PCIe/CXL, SFA 202 may also communicate with a GPU/FPGA/accelerator 210 using wide and parallel inter-die interfaces (IDI) such as Just a Bunch of Wires (JBOW). The interfaces between SFA 202 and GPU/FPGA/accelerator 210 are therefore shown as over PCIe/CXI/IDI 214b.

SFA 202 is a scalable and disaggregated I/O hub, which may deliver multiple terabits-per-second of high-speed server I/O and network throughput across a composable and accelerated compute system. In some embodiments, SFA 202 may enable uniform, performant, and elastic scale-up and scale-out of heterogeneous resources. SFA 202 may also provide an open, high-performance, and standard-based interconnect (e.g., 800/400 GbE, PCIe Gen 5/6, CXL). SFA 202 may further allow I/O transport and upper layer processing under the full control of an externally controlled transport processor. In many scenarios, SFA 202 may use the native networking stack of a transport host and enable ganging/grouping of the transport processors (e.g., of x86 architecture).

As depicted in FIG. 2, SFA 202 connects to one or more controlling host CPUs 204, endpoints 206, and Ethernet ports 208. A controlling host CPU or controlling host 204 may provide transport and upper layer protocol processing, act as a user application "Master," and provide infrastructure layer services. An endpoint 206 (e.g., GPU/FPGA/accelerator 210, storage 212) may be producers and consumers of streaming data payloads that are contained in communication packets. An Ethernet port 208 is a switched, routed, and/or load balanced interface that connects SFA 202 to the next tier of network switching and/or routing nodes in the data center infrastructure.

In some embodiments, SFA 202 is responsible for transmitting data at high throughput and low predictable latency between:

Network and Host;
Network and Accelerator;
Accelerator and Host;
Accelerator and Accelerator; and/or
Network and Network.

The details of data transmission between various entities (e.g., network, host, accelerator) will be described below with reference to FIGS. 4-7. However, in general, when transmitting data/packets between the entities, SFA 202 may separate/parse arbitrary portions of a network packet and map each portion of the packet to a separate device PCIe address space. In some embodiments, an arbitrary portion of the network packet may be a transport header, an upper layer protocol (ULP) header, or a payload. SFA 202 is able to transmit each portion of the network packet over an arbitrary number of disjoint physical interfaces toward separate memory subsystems or even separate compute (e.g., CPU/GPU) subsystems.

By identifying, separating, and transmitting arbitrary portions of a network packet to separate memory/compute subsystems, SFA 202 promotes the aggregate packet data movement capacity of a network interface into heterogeneous systems consisting of CPUs, GPUs/FPGAs/accelerators, and storage/memory. SFA 202 may also factor, in the various physical interfaces, capacity attributes (e.g., bandwidth) of each such heterogeneous systems/computing components.

In some embodiments, SFA 202 may interact with or act as a memory manager. SFA 202 provides virtual memory management for every device that connects to SFA 202. This allows SFA 202 to use processors and memories attached to it to create arbitrary data processing pipelines, load balanced data flows, and channel transactions towards multiple redundant computers or accelerators that connect to SFA 202.

SFA System Components

Figure 3A:
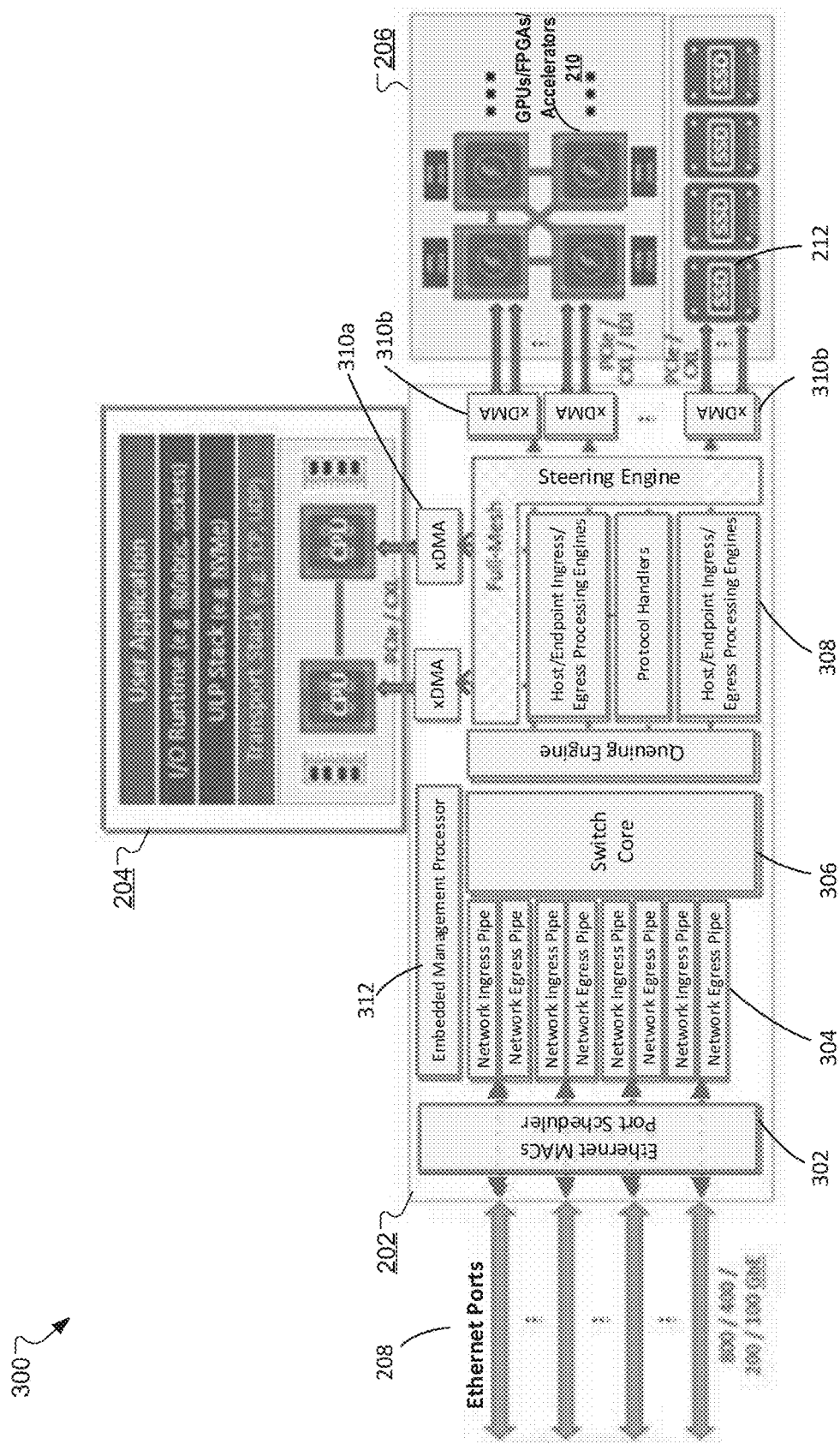
FIG. 3A illustrates components of a server fabric adapter architecture, according to some embodiments.

FIG. 3A illustrates components of a server fabric adapter architecture 300, according to some embodiments. SFA system 300 is used in a data center network for accommodating applications such as distributed neural network training, ray-tracing graphics processing, or scientific computing, etc. As shown in FIG. 3A, SFA 202 also connects with controlling hosts 204 and endpoints 206 and communicates with the other portions of the data center network through Ethernet ports 208. Endpoints 206 may include GPU/FPGA/accelerator 210 and/or storage/memory element 212. In some embodiments, SFA system 300 may implement one or more of the following functionalities:

splitting a network packet into partial packets, e.g., a transport header, a ULP header, or a payload.

mapping a full packet or partial packets (e.g., payload) to and from a set of P endpoints 206, where P is an integer, and the P endpoints 206 are capable of arbitrary packet processing and/or packet storage.

mapping a full packet or partial packets (e.g. a transport header and a ULP header) to and from a set of N controlling hosts 204, where N is an integer, and the N controlling hosts 204 are capable of arbitrary packet processing or packet header processing.

maintaining dynamic associations between active sessions on any of the N controlling hosts 204 to the I/O buffers in any of the P endpoints 206.

performing arbitrary routing and capacity allocation from the network towards GPUs/FPGAs/accelerators 210, where the arbitrary routing and capacity allocation may include sharding and aggregation.

building arbitrary data flow pipelines, where data can reside on any device attached to SFA 202, and other similarly connected devices can access SFA 202 in a safe and isolated manner.

performing arbitrary homing of accelerators to compute complexes on a given SFA, with a low latency path for quick message passing and a high bandwidth path for streaming data amongst devices connected to the SFA.

In some embodiments, SFA 202 identifies the partial packet parts of a network packet that may constitute a header. SFA 202 also identifies a payload of the network packet at arbitrary protocol stack layers. The arbitrary protocol stack layers may include message-based protocols layered on top of byte stream protocols. SFA 202 makes flexible yet precise demarcations as to the identified header and payload. Responsive to identifying the header and payload, SFA 202 selects which parts or combinations of the header and payload should be sent to which set of destinations.

Unlike a NIC (e.g., NIC 110), SFA 202 enables a unified application and communication software stack on the same host complex. To accomplish this, SFA 202 transmits the transport headers and ULP headers exclusively to controlling hosts 204 although the controlling hosts may be different CPUs or different cores within the same CPU. As such, SFA 202 enables parallelized and decoupled processing of protocol layers in the host CPU, and further confines that layer of processing to dedicated CPUs or cores.

In some embodiments, SFA 202 provides protocol headers (e.g., transport headers) in a first queue, ULP headers in a second queue, and data/payload in a dedicated third queue, where the first, second, and third queues may be different queues. In this way, SFA 202 may allow the stack to make forward progress in parallel, and further allow a native mechanism with little contention where multiple CPUs or CPU cores can be involved in handling the packet if it is desired.

SFA 202 enables per-flow packet sequencing and coalesced steering per CPU core. Therefore, SFA system 300 allows a solution where a standard CPU complex with a familiar stack can be made a data processing unit (DPU) processor and achieve significantly higher performance. In some embodiments, the present SFA architecture 300 may also eliminate operational dependency on hidden NIC firmware from operators of the data center network.

In some embodiments, SFA 202 includes one or more per-port Ethernet MACs & port schedulers 302, one or more network ingress and egress processing pipelines 304, a switching core 306, one or more host/endpoint egress and ingress pipelines 308, one or more memory transactors (e.g., direct memory access (DMA) engines), and an embedded management processor 312. Surrounding the host/endpoint egress and ingress pipelines 308 is a shared memory complex, which allows the SFA to directly buffer the packets to the corresponding flows instead of overprovisioning and stranding, or underprovisioning and dropping.

Figure 3B:
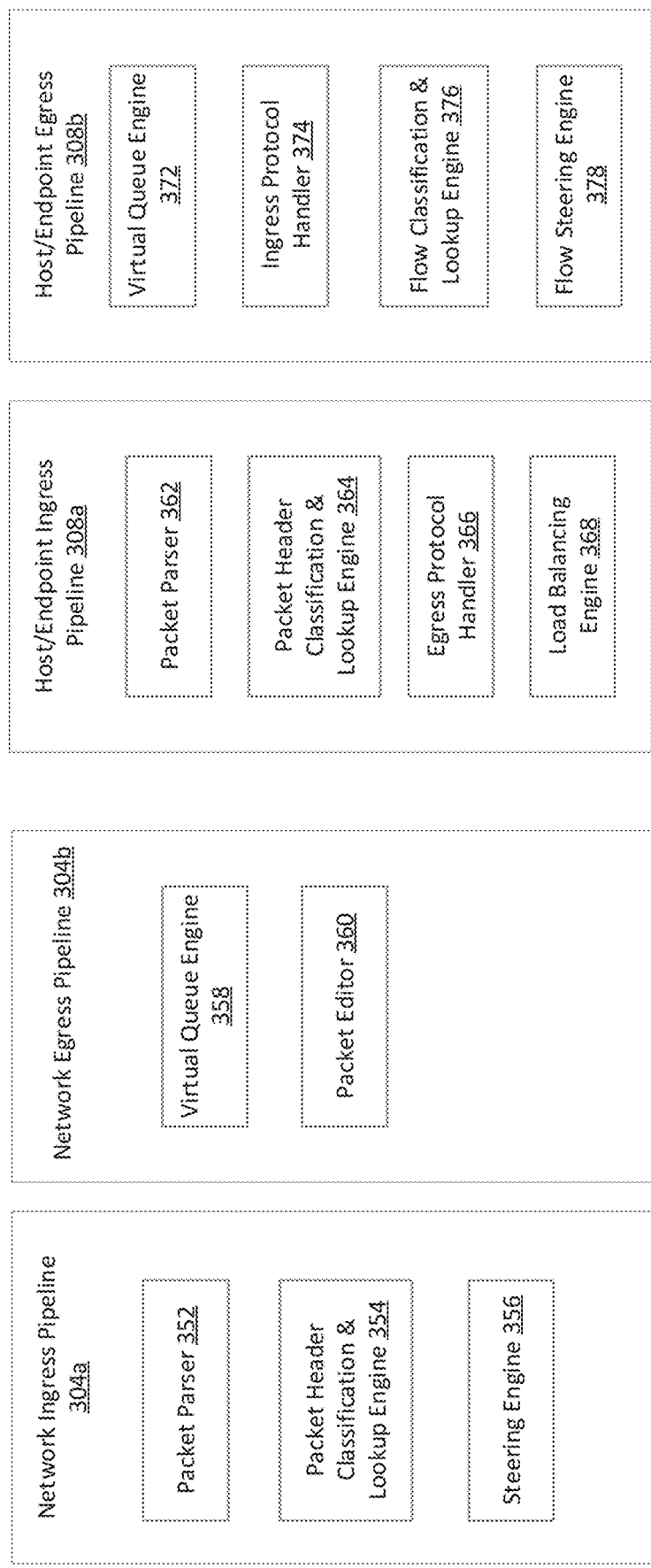
FIG. 3B illustrates components of ingress and egress pipelines, according to some embodiments.

FIG. 3B illustrates components of ingress and egress pipelines. In some embodiments, network ingress and egress processing pipeline 304 includes a network ingress pipeline 304a and a network egress pipeline 304b. As shown in FIG. 3B, each network ingress pipeline 304a includes a packet parser 352, a packet header classification & lookup engine 354, and a steering engine 356. Each network egress pipeline 304b includes a virtual queuing engine 358 and a packet editor 360. In some embodiments, host/endpoint ingress and egress processing pipeline 308 includes a host/endpoint ingress pipeline 308a and a host/endpoint egress pipeline 308b. Each host/endpoint ingress pipeline 308a includes a packet parser 362, a packet header classification & lookup engine 364, an egress protocol handler 366, and a load balancing engine 368. Each host/endpoint egress pipeline 308b includes a virtual queuing engine 372, an ingress protocol handler 374, a flow classification and lookup engine 376, and a flow steering/queuing engine 378.

Example Packet Receiving Procedure

As described above, SFA 202 may be used to transmit data between network and host, between network and accelerator, between accelerator and host, between accelerator and accelerator, and between network and network. Instead of describing every data transmission process between different entities, the present disclosure illustrates an example procedure for packet receiving from the network to the host/endpoint herein. The data transmission flows between different entities are also described below in FIGS. 4-7.

SFA 202, in the packet receiving direction from the network to the host/endpoint, delivers streaming payloads to GPUs/FPGAs/accelerators 210 and storage 212 using zero-copy I/O without requiring controlling CPU/host 204 to first complete the receipt of the headers. In some embodiments, a data-receiving processing flow is as follows:

At step 1, a packet is received from an outside network via Ethernet port 208. The packet is delineated in Ethernet MAC into one or more cells via Ethernet MACs & port schedulers 302. A cell is a portion of the packet, e.g., a payload cell. Ethernet MACs & port schedulers 302, along with its arbitration engine (not shown), then schedules and passes the one or more cells of the packet into network ingress pipeline 304a.

At step 2, packet parser 352 of network ingress pipeline 304a parses the packet and obtains the packet header(s). Packet header classification & lookup engine 354 of network ingress pipeline 304a then classifies the packet header(s) as a flow or flow aggregate in the network ingress pipeline based on one or more table lookups.

At step 3, packet header classification & lookup engine 354 determines whether to split the packet based on the result of the table lookups performed at step 2 in network ingress. In some embodiments, if it is determined that the packet should not be split, packet header classification & lookup engine 354 may record the forwarding result to be a single destination among the N controlling hosts 204. That is, the entire packet will be sent atomically and in-order to the single destination of the N controlling hosts 204. However, if it is determined that the packet should be split, packet header classification & lookup engine 354 may record a first forwarding result and a second forwarding result. Packet header classification & lookup engine 354 may record the first forwarding result to indicate that one or more headers of the packet (e.g. transport header, ULP header) should be forwarded to a destination among the N controlling hosts 204. Packet header classification & lookup engine 354 may also record the second forwarding result to indicate that the payload of the packet should be forwarded to a different destination among the P endpoints.

At step 4, packet header classification & lookup engine 354 sends the packet, the metadata recording the parsing, and the forwarding and classification results to steering engine 356 of network ingress pipeline 304a. Steering engine 356 performs the requested action (could be direct mapped or load balanced via a consistent hash) on the parsed packet header to determine which host/endpoint egress pipeline 308b the packet should be switched to.

At step 5, steering engine 356 of network ingress pipeline 304a forwards the packet/cells to switch core 306 such that switch core 306 may write the packet header, metadata, and payload cells into a switch core buffer. This shared switch core buffer allows SFA 202 to make a steering decision without having to move the payload around different entities.

At step 6, upon a specific host/endpoint egress pipeline 308b being determined, virtual queuing engine 372 of this host/endpoint egress pipeline 308b stores multiple linked lists of the packets or cells written into the switch core buffer as the packets/cells arrive. In this way, each host/endpoint egress pipeline 308b may maintain multiple pointer queues with at least per ingress port granularity, per class granularity, or per flow granularity.

At step 7, virtual queue engine 372 enqueues a packet header descriptor in an appropriate virtual queue based on at least one of the network ingress classification result or the steering result received from packet header classification & lookup engine 354 and steering result 356. The packet metadata cell is the only component that is operated on, and it represents all the information in the header while also carrying references to the real packet header and payload.

At step 8, when a packet can be dequeued from the appropriate queue, virtual queuing engine 372 reads a packet metadata cell corresponding to the packet from the switch core buffer and sends the packet metadata cell to flow classification & lookup engine 376 of host/endpoint egress pipeline 308b. In the meanwhile, virtual queuing engine 372 reads the corresponding first cell of the packet payload from the switch core buffer and sends the first cell of the packet payload to ingress protocol handler 374 of host/endpoint egress pipeline 308b.

At step 9, flow classification & lookup engine 376 of host/endpoint egress pipeline 308b classifies the packet metadata corresponding to the packet descriptor and searches/looks up the packet metadata in a flow table.

At step 10, based on the result of the lookups in the flow table (e.g., flow lookups), flow steering engine 378 of host/endpoint egress pipeline 308b writes the packet header descriptor to an appropriate per-flow header queue destined for a given host interface. Flow steering engine 378 also writes a packet data descriptor to an appropriate data queue destined for an endpoint interface. The packet data descriptor is a compact structure that describes the packet payload.

It should be noted that the metadata is placed into virtual queues of the switch core buffer such that SFA 202 can classify the network packets at an early stage of data switching. In addition, these virtual queues or flow queues can keep the flows consistent and treat the flows coherently throughout the SFA system.

At step 11, when the specific host posts an internal I/O buffer indicating that the host is ready to receive a packet from SFA 202, flow steering engine 378 retrieves the corresponding headers and payload data from corresponding queues. For example, flow steering engine 378 dequeues the packet header descriptor at the head of the packet from the per-flow header queue. Flow steering engine 378 also reads the corresponding packet header and payload data cells from the switch core buffer into the memory transactor and writes the packet header and payload data cells to a DMA engine at the host and/or endpoint interface.

At step 12, when the payload transfer over DMA to the endpoint host is completed for the packet, host egress pipeline 308b of SFA 202, e.g., via flow steering engine 378, may signal the host to write a completion queue entry corresponding to the header submission queue entry of the packet.

Because the payload is buffered in the switch core, manipulation of the packet for the purpose of adjusting quality of service (QoS) or coalescing to improve the effective packet rate is a function of purely manipulating the metadata cells. This allows the switch core buffering to operate independently from the packet processing pipeline while allowing a large number of temporary contexts for packet processing. At step 13, generic receive offload (GRO) may be performed. For example, a large number of packets in a transmission control protocol (TCP) stream may be collapsed into a single packet without having to copy or move the packet data around.

Switch Core

Switch core 306 of SFA 202 uses a shared memory output queued scheme. In some embodiments, switch core 306 manages a central pool of memory. As a result, any ingress port of SFA 202 can write any memory location, and any egress port of SFA 202 can read from any memory location. In addition, switch core 306 allows packet buffer memory to be managed in units of cells, where the cell size is globally defined to trade-off memory fragmentation. The memory fragmentation may be caused by the partial occupancy in relation to mapping data structure cost. Switch core 306 is also the central point of allocation of packet pointers from internal memory cells in memory banks. Further, using the shared memory output queued scheme of switch core 306, network ingress and host ingress pipelines can read and write into arbitrary offsets of a packet. For example, the network ingress and host ingress pipelines may specify the cell address, the operation requested, and the data to be written (when there is a "write" operation). The "write" operations update the entire cell, and thus there are no partial writes. Moreover, switch core 306 allows any packet cell to be partially filled.

Network, Host and Accelerator Interfaces

Network interfaces are used to connect an SFA system to one or more networks. The network interfaces are address less bi-directional streams following well-defined formats at each of the layers. These formats at each layer may include: serializer/deserialzer (SERDES) and physical coding sublayer (PCS) at layer 1, Ethernet with or without virtual local area network (VLAN) headers at layer 2, internet protocol IPv4 and IPv6 at layer 3, two levels of inner and outer headers for network overlays, configurable transport headers with native support for transmission control protocol (TCP) and user datagram protocol (UDP) at layer 4, and also up to two transport layer headers (e.g., RDMA over UDP).

As depicted in FIG. 3A, there are two types of network interfaces: 310a and 310b. A DMA host interface 310a is used to connect SFA 202 to one or more controlling hosts 204. This interface 310a is essentially PCIe- or CXL-based. That is, interface 310a may be used for address-based load, or store plus memory posted writes and read split transactions. PCIe/CXL naturally defines the SERDES and PCS at layer 1, the PCIe/CXL at layer 2 including flow control, and the PCIe/CXL transport layer, e.g., transaction layer packet/flow control unit (TLP/FLIT), at layer 4.

A DMA or memory mapped accelerator interface 310b is used to connect SFA 202 to an endpoint 206. The endpoint includes a GPU, accelerator ASIC, or even storage media. At the transaction level, interface 310b consists of memory type transactions. These transactions are transported over the SERDES and PCS at layer 1 of interface 310b. Depending on the protocol and accelerator type, interface 310b may have different layer 2 and optional layer 4. However, in all cases, interface 310b may use an adaptation layer above layers 2 and 4 to expose memory/read semantics into the individual memory space of each accelerator.

Protocol Handlers

In some embodiments, a protocol handler is a functional block inside host ingress/egress pipeline, for example, egress protocol handler 366 inside host ingress pipeline 308a and ingress protocol handler 374 inside host egress pipeline 308b. The protocol handler is capable of processing packets at a very high individual rate while allowing its functionalities to be programmable.

Protocol handlers inside host ingress and host egress pipelines operate at the stream level (e.g., above TCP layer) or at the packet level. A protocol handler, e.g., an ingress protocol handler, may have some unique characters and perform specific functionalities.

In some embodiments, an ingress protocol handler is asynchronously triggered by packet arrivals or by timers. The ingress protocol handler completes its operation upon the packet disposition.

In some embodiments, the ingress protocol handler may extract ULP headers of L5 protocols above TCP by requesting specific byte offsets or ranges to be delivered to the protocol handler. The host egress pipeline skips intermediate bytes and directly moves the intermediate bytes (the L5 payload) towards the corresponding memory transactors based on the previous dispositions of the protocol handler determined for that flow. The offsets or ranges are within a host egress TCP reassembled contiguous byte stream.

In some embodiments, the ingress protocol handler determines packet dispositions through a set of actions. The set of actions may include: (1) writing metadata results into a packet metadata cell; (2) queuing the dispositions, e.g., discard, recirculation (e.g., through a different queue), steering, etc.; (3) Trimming the payload to extract the bytes per the embedded protocol; (4) triggering a pre-configured packet towards a programmable destination.

In some embodiments, the ingress protocol handler may have read and/or write access to any offset of a packet when the packet is queued in memory. In some embodiments, the ingress protocol handler may also have local memory and thus may create cross packet-state in the local memory for custom use of the ingress protocol handler.

Flow Diagram of Packet Transfer Using SFA

SFA 202 can be used to transmit data at high throughput and low predictable latency between network and host, between network and accelerator, between accelerator and host, between accelerator and accelerator, and between network and network.

FIG. 4 illustrates an exemplary data flow diagram 400 from a network (e.g., network 402) to a host or endpoint (e.g., host/endpoint 206). In some embodiments, upon receiving a network packet 404, SFA 202 breaks the packet apart into portions, e.g., using host/endpoint egress processing engine/pipeline 308b. These portions include a transport header 406, an upper layer protocol (ULP) header 408, and a data payload 410. SFA 202 then combines payload 410 with a PCIe header/DMA descriptor 412 and sends the combined data to the endpoint/host 206, as shown in arrow 414. SFA 202 also sends transport header 406 and ULP header 408 to the host memory of controlling host 204 as shown in arrows 416 and 418 respectively.

As shown in FIG. 4, an atomic message or packet 404 can be split into a number of header fields and payload. The header fields are sent to a set of controlling host CPUs, while the payload is sent to the endpoints. Therefore, instead of switching on the level of packets or messages, the SFA system described herein maintains an arbitrary association between the host CPUs and endpoints, and performs switching or steering from inside a packet. The SFA system herein separates the packet into portions and sends each portion to different PCIe addresses. A key advantage of the novel SFA system described herein is that existing NIC systems map an entire packet into a single PCIe address space or Root Complex, while SFA 202 allows each portion of a packet to be separated and sent to different PCIe address spaces or Root Complexes.

While network packet 404 in FIG. 4 is separated into three different PCIe addresses, this is only an exemplary case. SFA 202 allows a packet to be separated into an arbitrary number of headers and sent into different places, where the headers will be sent to one or more controlling hosts while the payload is sent to an endpoint. Since SFA 202 disaggregates a packet into an arbitrary number of portions and sends the portions across PCIe address spaces, the SFA system described herein achieves scalable association and uniqueness (i.e., switching portions of packet).

FIG. 5 illustrates an exemplary data flow diagram 500 for packet transmission from a host/endpoint (e.g., host 204, endpoint 206) to a network (e.g., network 502). In some embodiments, host/endpoint ingress processing engine/pipeline 308a of SFA 202 receives transport header 504 and upper layer protocol (ULP) header 506 from controlling host 204, and receives payload 508 from endpoint 206 (e.g., SSD 212). Although headers and payload are from different sources, a header is not disassociated with a payload. SFA 202 maintains a relationship between the header and the payload. For example, a header indicates where the payload should be routed to. Based on such a relationship, SFA 202 combines the received headers 504, 506 and payload 508 into a network packet 510. SFA 202 then sends network packet 510 out to network 502.

It should be noted that since SFA 202 is scheduling and tracking the state of the network ports and all the input queues (e.g., transport, ULP and data sources), SFA 202 may make precise decisions about enforcing quality of service (QoS), isolation and fairness between consumers of the network ports. From tracking, SFA 202, specifically switch core 306, may determine if progress is being made for each traffic class that the classified packets belong to and each of the output ports corresponding to the traffic classes. Progress happens when the egress virtual queues are draining, and the data of the queues are not being blocked or backing up. The traffic class can be port-based or packet-based classification. In either way, the destination scheduling state is known to the SFA for that class as described herein. From scheduling, SFA 202, e.g., a QoS scheduler (not shown), maintains statistics for each of the inputs. An input may be an input port, a transmit queue, or a network port. The QoS scheduler of SFA 202 may stop fetching a packet from the input port if, upon a forwarding decision, the packet was destined to a port that was blocked. As compared to the Host to Network path in a traditional system, where a packet transfer follows the route like HostáNICáSwitchASwitch, each layer can only make local decisions. Therefore, even if the path to a destination is blocked, the NIC may still send the packets to the switch, and the switch then drops or discards the packets. In contrast, since SFA 202 tracks and knows the state of switch ports, SFA 202 will keep the packets on the host (without even fetching them) when the path to a destination is blocked. SFA 202 may start packet transfer again when SFA 202 determines that the output port is going to make progress. It is critical that SFA 202 has visibility into the state of the host (e.g., a NIC interface) and the network (e.g., a switch interface), which allows SFA 202 to make the arbitration decision precisely. This is significantly advantageous as compared to statistical decisions based on sampling of the data on ports used in standard top-of-rack switch systems.

In addition, the SFA system described herein allows much higher overall packet bandwidth to be streamed or scaled than existing systems because, on the host/endpoint side, there is typically much higher data rate required for payload transfers than for header transfers. Because the SFA can dedicate more PCIe/CXL I/O bandwidth to/from endpoints (e.g. GPU/FPGA/accelerators or storage/memory) versus to/from controlling hosts, the SFA based system can transmit or receive complete packets and make progress in either direction at a higher throughput than a system where header and payload transfers share the same fixed PCIe/CXL I/O bandwidth. Further, the SFA system described herein allows a much higher packet processing rate to be scaled because controlling host CPUs can be scaled and aggregated as opposed to some existing systems that limit one, or a few, controlling host CPUs to only a single NIC.

FIG. 6 illustrates an exemplary data packet flow diagram 600 for peer-to-peer transmission. Peer-to-peer data transmission can be between network and network as shown in dash-lined circle 602, or between endpoint and endpoint as shown in dash-lined circle 604. For network to network packet flow shown in 602, an Ethernet switch/router may be responsible for forwarding, classification, and load balancing of network packets when the packets move through SFA 202 via the data path of network ingress, switch core, and then network egress. For endpoint to endpoint communications shown in 604, the host/endpoint ingress processing pipeline (e.g., 308a) of SFA 202 receives the payload of a packet flows from a source endpoint (e.g. GPU 210). This payload is passed to switch core (e.g. 306). The switch core then routes the payload to the host/endpoint egress processing pipe (e.g., 308b) of SFA 202 of a destination endpoint (e.g. storage 212). In some embodiments, the payload transfer from a source endpoint may be triggered by either (1) a scatter gather list (SGL) write initiated by the source endpoint to the destination endpoint memory address via standard queue interfaces of SFA 202, or (2) a host-initiated cache line operation through the memory mapped windows of SFA 202, as shown in 606.

Figure 7:
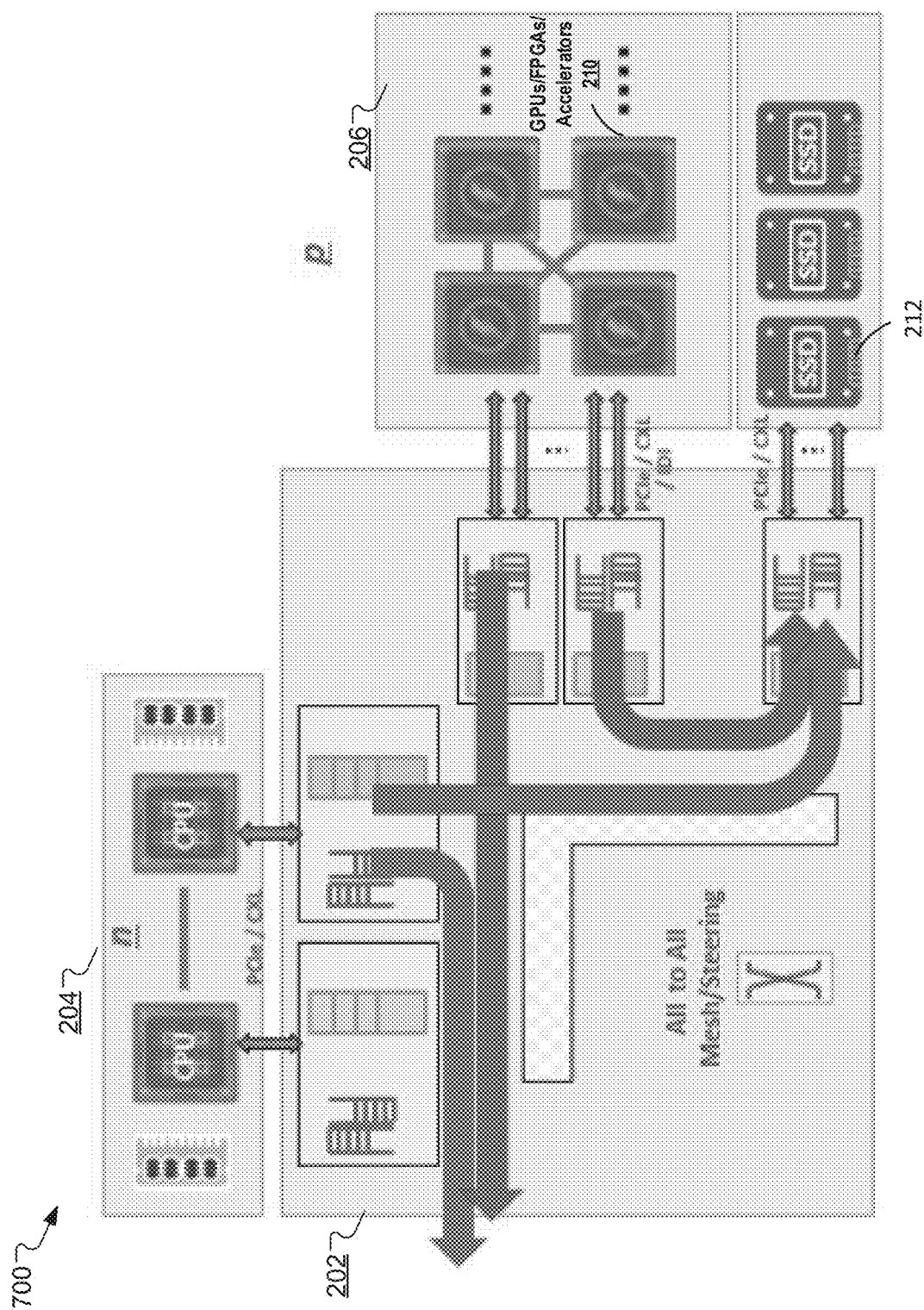
FIG. 7 illustrates a host view of packet flow to a network, according to some embodiments.

FIG. 7 illustrates a host view 700 of packet flow to a network. SFA 202 selects p ports that connect SFA 202 to GPUs 210 and storage (e.g., SSDs 212). SFA 202 selects n ports that connect SFA 202 to controlling host 204. In some embodiments, each p port is a PCIe endpoint to a unique n port. Any SFA queue can be mapped into any p or n port. n ports have header queues. p ports have queues to submit scatter-gather lists. Memory Mapped windows allow any-to-any cache line exchange. As explained above, n and p port packets combine (e.g., data from header queues with SGL's) to generate network packets. n and p ports may also combine to generate peer-to-peer traffic, such that the header queues can indicate which local ports to send the SGL's to. For example, the payload is combined with the header on the source side (e.g., in a TransmitHeaderQueue). The combined data is passed to a Host Egress virtual queue, where the payload is stripped and directly placed into the receive SGL's on the destination side (e.g., in a ReceiveHeaderQueue). For peer to peer signaling, memory mapped windows may provide extremely low latency inter-process communication (IPC) or doorbell primitives, which can operate in interrupt or polling with memory waiters.

Figure 8:
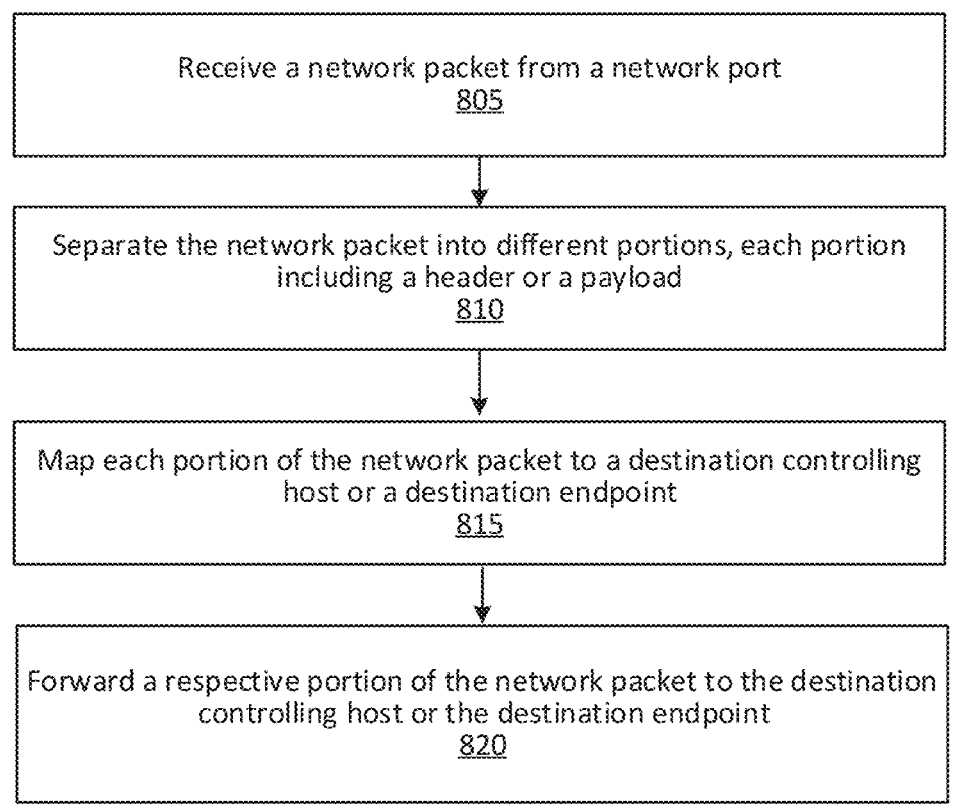
FIG. 8 illustrates an exemplary process of transmitting data from a network to a host/endpoint in a server fabric adapter (SFA) communication system, according to some embodiments.

FIG. 8 illustrates an exemplary process 800 of transmitting data from a network to a host/endpoint in an SFA communication system, according to some embodiments. In some embodiments, the SFA communication system includes an SFA (e.g., SFA 202) communicatively coupled to a plurality of controlling hosts, a plurality of endpoints, and a plurality of network ports. Process 800 corresponds to the data flow in FIG. 4.

At step 805, the SFA receives a network packet from a network port of the plurality of network ports. At step 810, the SFA separates the network packet into different portions, each portion including a header or a payload. In some embodiments, prior to separating the network packet, the SFA also determines whether to separate the packet. If it is determined not to split the network packet, the SFA may transmit the entire other network packet to a controlling host of the plurality controlling hosts.

At step 815, the SFA maps each portion of the network packet to a destination controlling host or a destination endpoint. In some embodiments, the SFA may identify a controlling host of the plurality controlling hosts and designate the controlling host as the destination controlling host. The SFA may also identify an endpoint of the plurality of endpoints and designate the endpoint as a destination endpoint. In some embodiments, the SFA is configured to perform a consistent hash function on the parsed headers to determine the destination controlling host or the destination endpoint.

At step 820, the SFA forwards a respective portion of the network packet to the destination controlling host or the destination endpoint. In some embodiments, the SFA moves each portion of the network packet over one or more disjoint physical interfaces toward separate memory subsystems or separate compute subsystems.

Figure 9:
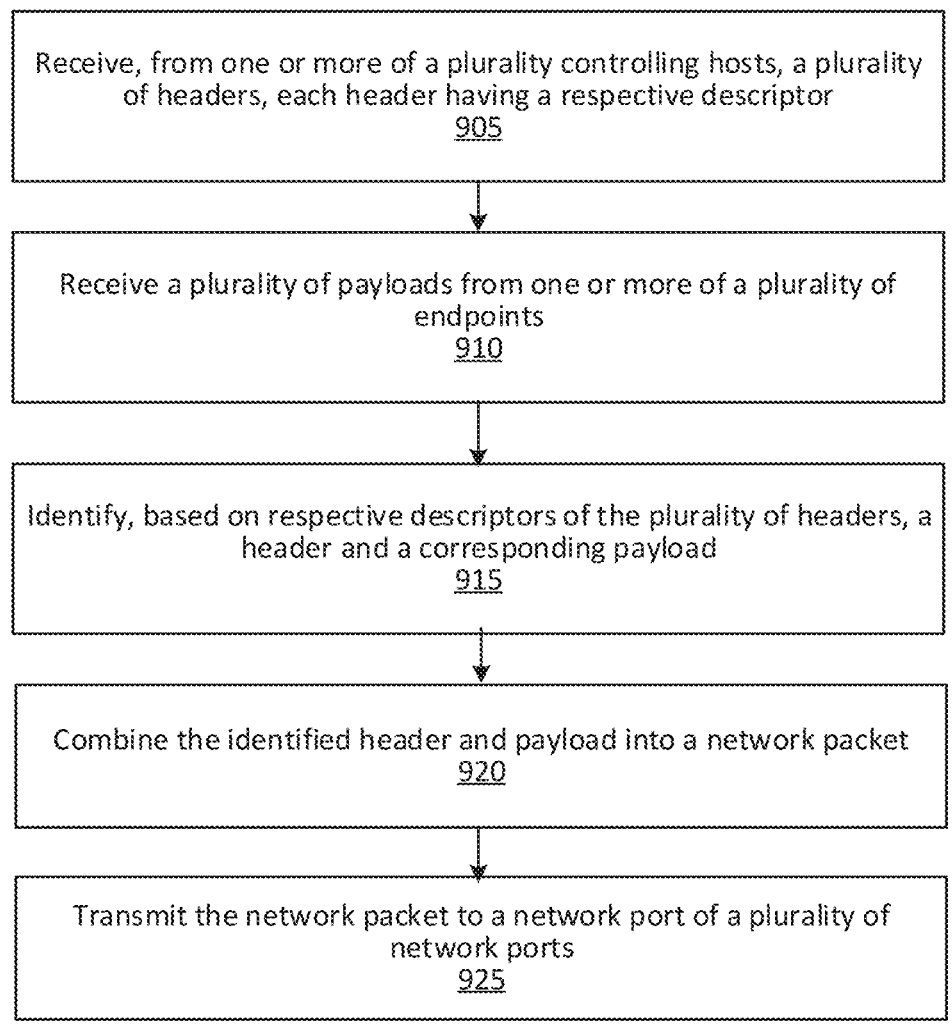
FIG. 9 illustrates an exemplary process of transmitting data from a host/endpoint to a network in an SFA communication system, according to some embodiments.

FIG. 9 illustrates an exemplary process 900 of transmitting data from a host/endpoint to a network in an SFA communication system, according to some embodiments. In some embodiments, the SFA communication system includes an SFA (e.g., SFA 202) communicatively coupled to a plurality of controlling hosts, a plurality of endpoints, and a plurality of network ports. Process 900 corresponds to the data flow in FIG. 5.

At step 905, the SFA receives from one or more of the plurality controlling hosts a plurality of headers, each header having a respective descriptor. At step 910, the SFA receives a plurality of payloads from one or more of the plurality of endpoints. At step 915, the SFA identifies, based on respective descriptors of the plurality of headers, a header and a corresponding payload. In some embodiments, a descriptor from the respective descriptors includes a data descriptor or a header descriptor. At step 920, the SFA combines the identified header and payload into a network packet. At step 925, the SFA transmits the network packet to a network port of the plurality of network ports.

Figure 10:
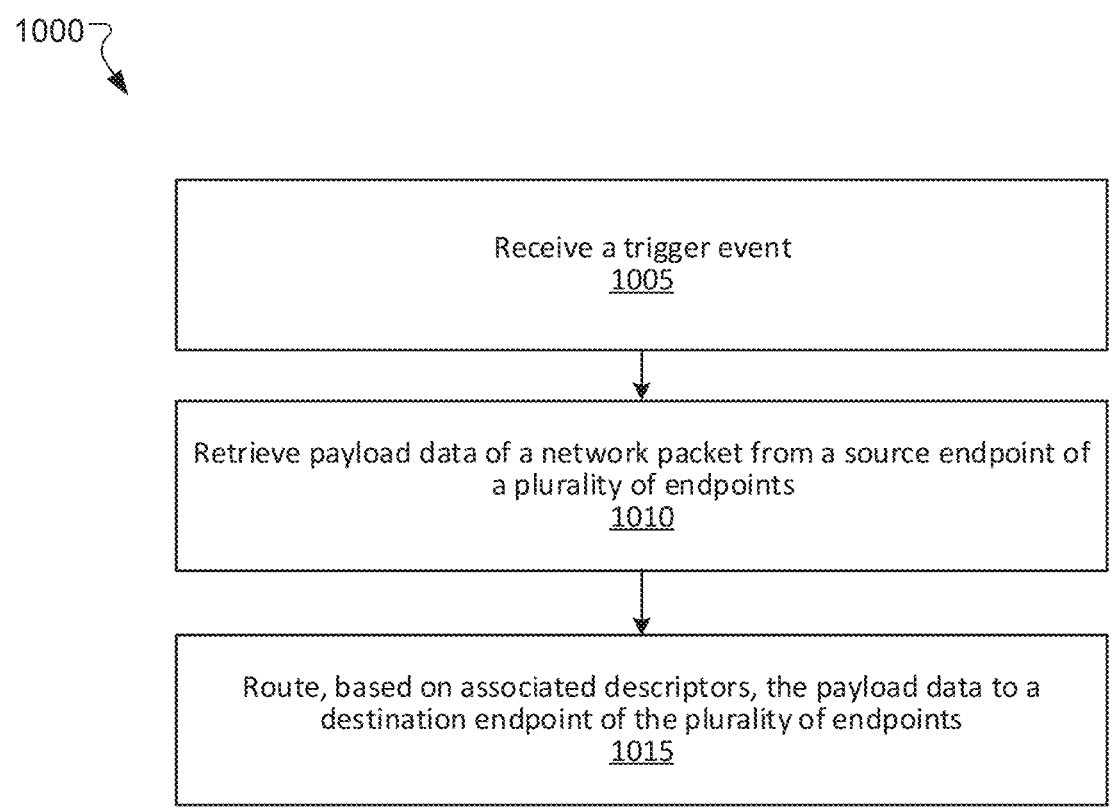
FIG. 10 illustrates an exemplary process of peer-to-peer data transfer in an SFA communication system, according to some embodiments.

FIG. 10 illustrates an exemplary process 1000 of peer-to-peer data transfer in an SFA communication system, according to some embodiments. In some embodiments, the SFA communication system includes an SFA (e.g., SFA 202) communicatively coupled to a plurality of controlling hosts, a plurality of endpoints, and a plurality of network ports. Process 1000 corresponds to the data flow in FIG. 6.

At step 1005, the SFA receives a trigger event. In some embodiments, the trigger is based on the receipt of associated descriptors that include at least one of a data descriptor or a header descriptor. At step 1010, the SFA retrieves payload data of a network packet from a source endpoint of the plurality of endpoints.

At step 1015, the SFA routes, based on associated descriptors, the payload data to a destination endpoint of the plurality of endpoints. In some embodiments, the trigger event is a scatter gather list (SGL) write initiated by the source endpoint to the destination endpoint memory address, and the data descriptor includes data pointing to the SGL. In other embodiments, the trigger event is a host-initiated cache line operation.

Figure 11:
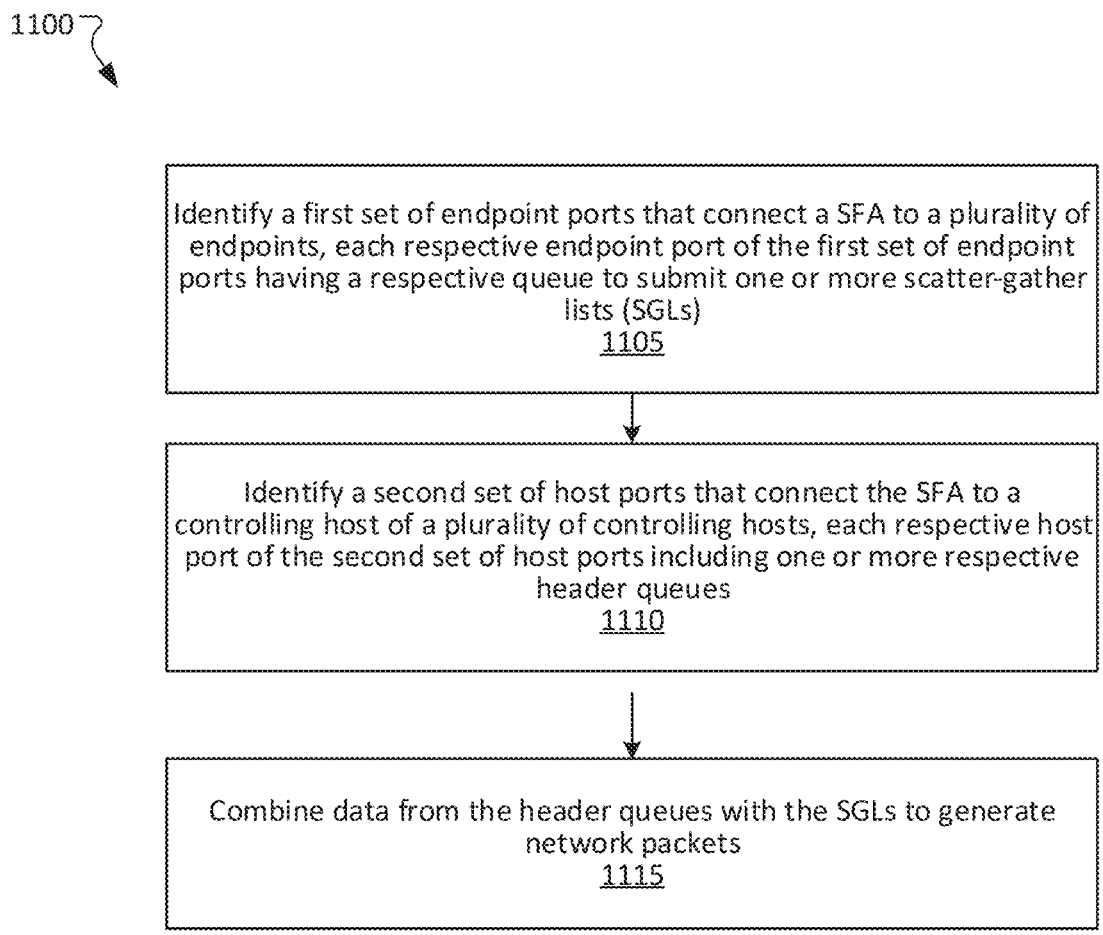
FIG. 11 illustrates an exemplary process of a host view of data transfer in an SFA communication system, according to some embodiments.

FIG. 11 illustrates an exemplary process 1100 of a host view of data transfer in an SFA communication system, according to some embodiments. In some embodiments, the SFA communication system includes an SFA (e.g., SFA 202) communicatively coupled to a plurality of controlling hosts, a plurality of endpoints, and a plurality of network ports. Process 1100 corresponds to the data flow in FIG. 7.

At step 1105, the SFA identifies a first set of endpoint ports that connect the SFA to the plurality of endpoints. Each respective endpoint port of the first set of endpoint ports has a respective queue to submit one or more scatter-gather lists (SGLs). At step 1110, the SFA identifies a second set of host ports that connect the SFA to a controlling host of the plurality of controlling hosts. Each respective host port of the second set of host ports includes one or more respective header queues. At step 1115, the SFA combines data from the header queues with the SGLs to generate network packets.

In some embodiments, the SFA is also configured to receive a network packet and divide the network packet into one or more headers and a payload. The SFA is then configured to identify, from the first set of endpoint ports, an endpoint port, and route the payload to an SGL of a queue associated with the identified endpoint port. The SFA is further configured to identify, from the second set of host ports, one or more host ports, and route the one or more headers to one or more header queues associated with the identified host ports. In some embodiments, the payload is transmitted to an arbitrary memory geometry based on the SGL of memory locations.

Additional Considerations

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method comprising:
   providing an endpoint port that connects a fabric adapter to an endpoint, wherein the endpoint port has a queue for the endpoint to submit one or more scatter-gather lists (SGLs);
   providing a host port that connects the fabric adapter to a controlling host, wherein the host port includes a header queue; and
   combining, by the fabric adapter, data from the header queue with an SGL of the one or more SGLs to generate a network packet.

2. The method of claim 1, wherein the network packet is used in peer-to-peer traffic.

3. The method of claim 1, further comprising dividing, by the fabric adapter, the network packet into one or more headers and a payload.

4. The method of claim 3, wherein the payload is transmitted to or received from an arbitrary memory geometry based on the SGL of memory locations.

5. The method of claim 1, further comprising transmitting and receiving, by the fabric adapter, network packets between one or more endpoints and one or more networks, between two endpoints, or between two networks.

6. The method of claim 5, wherein the networks are associated with a plurality of network ports that include one or more Ethernet ports.

7. The method of claim 1, wherein the fabric adapter is a scalable and aggregated input/output (I/O) hub.

8. The method of claim 1, wherein the endpoint is one of a storage element, a memory element, a graphics processing unit (GPU), an accelerator, or a field programmable gate array (FPGA).

9. The method of claim 1, wherein the endpoint is one of a plurality of endpoints, the method further comprising:
   receiving, by the fabric adapter, a trigger event;
   retrieving, by the fabric adapter, payload data of a second network packet from a source endpoint of the plurality of endpoints; and
   routing, based on associated descriptors and by the fabric adapter, the payload data to a destination endpoint of the plurality of endpoints.

10. The method of claim 9, wherein the associated descriptors include at least one of a data descriptor or a header descriptor.

11. The method of claim 10, wherein the trigger event is one of a host-initiated cache line operation or a SGL write initiated by the source endpoint to a memory address of the destination endpoint.

12. A system comprising:
    a fabric adapter comprising a processor, memory, a plurality of endpoint ports, and a plurality of host ports and communicatively coupled to a plurality of controlling hosts, a plurality of endpoints, and a plurality of network ports, the fabric adapter configured to:
       provide an endpoint port of the plurality of endpoint ports that connects the fabric adapter to an endpoint of the plurality of endpoints, wherein the endpoint port has a queue for the endpoint to submit one or more scatter-gather lists (SGLs);
       provide a host port of the plurality of host ports that connects the fabric adapter to a controlling host of the plurality of controlling hosts, wherein the host port includes a header queue; and
       combine data from the header queue with an SGL of the one or more SGLs to generate a network packet.

13. The system of claim 12, wherein the network packet is used in peer-to-peer traffic.

14. The system of claim 12, wherein the fabric adapter is further configured to transmit and receive network packets between one or more endpoints and one or more networks, between two endpoints, or between two networks.

15. The system of claim 12, wherein the plurality of network ports comprise one or more Ethernet ports.

16. The system of claim 12, wherein the fabric adapter is a scalable and aggregated input/output (I/O) hub.

17. The system of claim 12, wherein the plurality of endpoints comprise storage elements, memory elements, graphics processing units (GPUs), accelerators, or a field programmable gate arrays (FPGAs).

18. The system of claim 12, wherein the fabric adapter is further configured to:
    receive a trigger event;
    retrieve payload data of a second network packet from a source endpoint of the plurality of endpoints; and
    route, based on associated descriptors, the payload data to a destination endpoint of the plurality of endpoints.

19. The system of claim 12, wherein the associated descriptors include at least one of a data descriptor or a header descriptor.

20. The system of claim 12, wherein the trigger event is one of a host-initiated cache line operation or a SGL write initiated by the source endpoint to a memory address of the destination endpoint.

* * * * *